R. A. BARKLEY.
COUPLING FRAME FOR PLANTERS.
APPLICATION FILED JUNE 4, 1910.
978,539.
Patented Dec. 13, 1910.
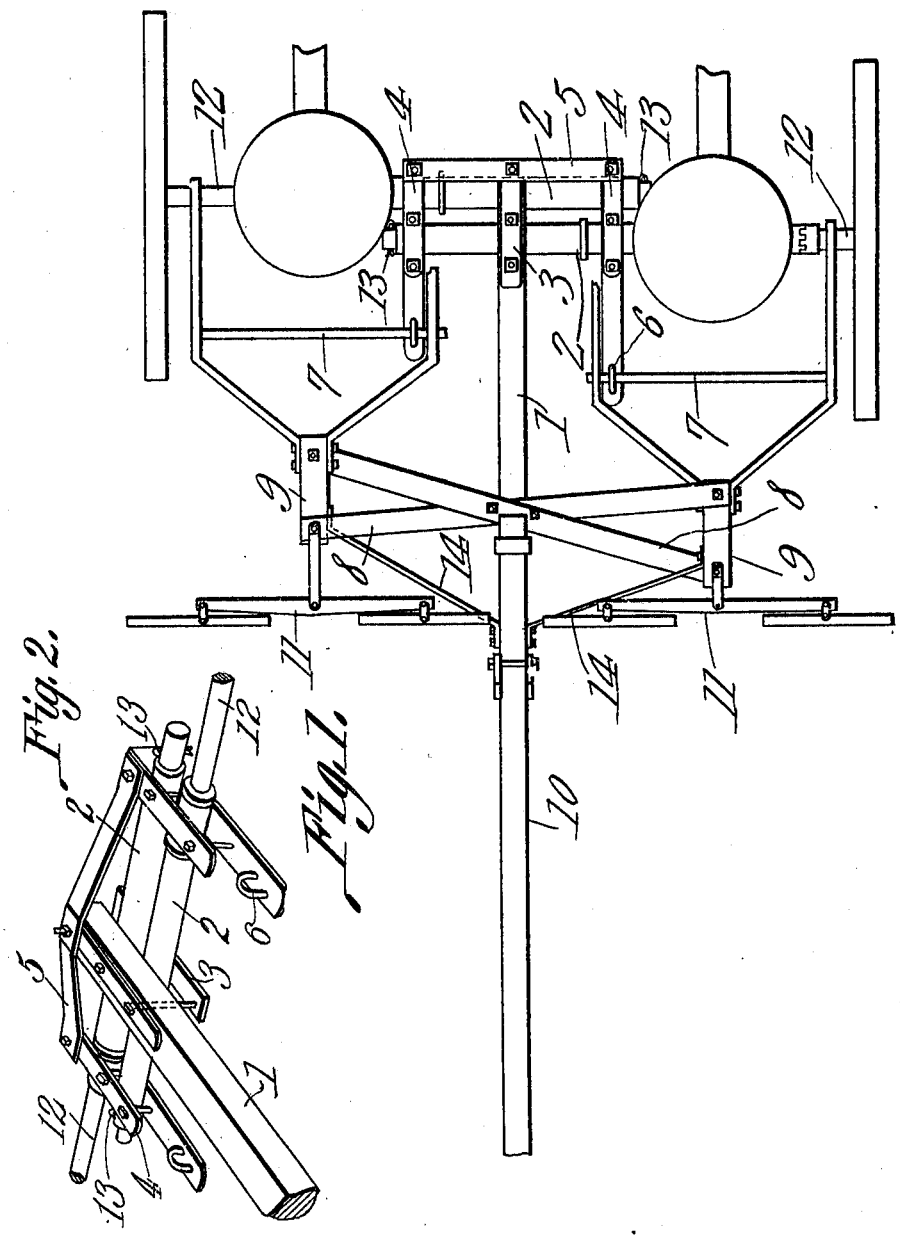

UNITED STATES PATENT OFFICE.

ROBERT A. BARKLEY, OF HAMILTON, TEXAS.

COUPLING-FRAME FOR PLANTERS.

978,539.  Specification of Letters Patent.  Patented Dec. 13, 1910.

Application filed June 4, 1910. Serial No. 565,036.

*To all whom it may concern:*

Be it known that I, ROBERT A. BARKLEY, a citizen of the United States, residing at Hamilton, in the county of Hamilton and State of Texas, have invented a new and useful Coupling-Frame for Planters, of which the following is a specification.

This invention relates to a coupling frame for planters and consists in the novel construction and arrangement of its parts as hereinafter shown and described.

The object of the invention is to provide a frame adapted to be applied to the frames of two planters whereby the said planters are coupled together and may be used simultaneously for planting purposes. With this object in view the structure includes a beam having at its rear end portion a pair of sleeves adapted to receive the inner ends of the axles of the planters and means for engaging portions of the frames of the planters. At its forward portion the said beam is provided with bracing means adapted to be secured at its end portions to the forward portions of the frames of the planters and a draft tongue is applied to the forward end portion of the said beam.

In the accompanying drawings:—Figure 1 is a top plan view of the coupling frame applied to the frames of two planters. Fig. 2 is a perspective view of a portion of the coupling frame with the major portions of the planters removed.

The coupling frame includes a beam 1 against the under side of the rear portion of which is secured sleeves 2 by means of an intermediate clamp plate 3 and end clamp plates 4 supported at the ends of a cross bar 5 which in turn is attached at its intermediate portion to the rear end of the beam 1. The lower clamp plates 4 are provided with hooks 6 which are adapted to engage portions of the frames of the planters indicated at 7 in Fig. 1 of the drawings. Cross bars 8 are attached at their intermediate portions to the forward portion of the beam and at their ends are secured to stub beams 9 forming parts of the frames of the planters 7. A draft tongue 10 is secured to the forward end of the beam 1 and draft appliances 11 such for instance as single and double trees are connected with the forward ends of the stub beams 9.

In practice the inner end portions of the axles 12 of the planter 7 are located in the sleeve 2 and are held therein by means of cotter pins 13 so that the said axles are free to rotate but cannot move longitudinally out of the said sleeve 2. By this arrangement it will be seen that two horses or draft animals may be attached to each of the draft appliances 11 and that the two planters are operatively connected together and as they are drawn along the surface of the ground the said planters will plant two rows simultaneously.

The planters as shown are especially adapted to be used for planting cotton seed but it is to be understood that the coupling frame may be employed for connecting together planters of any other description. In addition to the cross bars 8 the forward end portions of the stub beams 9 are connected with the sides of the forward ends of the beam 1 by means of braces 14. Therefore it will be seen that a simple and durable means is provided for effectually coupling together the frames of two planters and causing the said planters to operate simultaneously whereby considerable time and much labor is saved during the planting season.

Having described the invention what I claim as new and desire to secure by Letters Patent is:—

A coupling frame for planters comprising a beam, parallel sleeves secured at intermediate points to the rear end portion of the beam and adapted to receive the planter axles, a bar fixed to the rear end of the beam and extending transversely of the same, clamp devices carried at the outer ends of said bar and engaging the end portions of the sleeves, said clamps adapted to be connected with the planter frames, and means for connecting the forward portion of the beam with the forward portions of the planter frames.

In testimony that I claim the foregoing as my own, I have hereto affixed my signature in the presence of two witnesses.

ROBERT A. BARKLEY.

Witnesses:
EPH. RODDY,
ROBERT A. BAGGETT.